March 11, 1958 W. H. LYON ET AL 2,826,642

ERASER FOR MAGNETICALLY RECORDED BULK TAPE IN ROLL FORM

Filed Oct. 2, 1952 3 Sheets-Sheet 1

INVENTORS
WILLIAM H. LYON
LINCOLN THOMPSON
BY
H. G. Manning
ATTORNEY

ERASER FOR MAGNETICALLY RECORDED BULK TAPE IN ROLL FORM

Filed Oct. 2, 1952 3 Sheets-Sheet 2

INVENTORS
WILLIAM H. LYON
LINCOLN THOMPSON
BY
H. G. Manning
ATTORNEY

March 11, 1958 W. H. LYON ET AL 2,826,642

ERASER FOR MAGNETICALLY RECORDED BULK TAPE IN ROLL FORM

Filed Oct. 2, 1952 3 Sheets-Sheet 3

INVENTORS
WILLIAM H. LYON
LINCOLN THOMPSON
BY
H. G. Manning
ATTORNEY

1

2,826,642

ERASER FOR MAGNETICALLY RECORDED BULK TAPE IN ROLL FORM

William H. Lyon, Orange, and Lincoln Thompson, Cheshire, Conn., assignors to The SoundScriber Corporation, New Haven, Conn., a corporation of Connecticut Application October 2, 1952, Serial No. 312,824

12 Claims. (Cl. 179—100.2)

This invention relates to magnetic tape recording, and more particularly to an eraser for a cylindrical roll of magnetically recorded tape.

One object of the present invention is to provide a tape eraser of the above nature in which the roll of tape is introduced manually into a strong alternating magnetic field produced between a pair of relatively widely spaced poles surrounded by a pair of highly inductive electromagnetic coils comprising the inductance of a tuned electrical circuit.

A further object is to provide a tape eraser of the above nature in which the axis of the roll of tape is located above the pair of electromagnetic coils, each having a large number of turns, for producing an alternating current preferably having a wave form of peaked shape and rich in harmonics.

A further object is to provide a device of the above nature in which a high voltage is induced across the highly inductive coils, thus avoiding the need for a high voltage power source.

A still further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawings one form in which the invention may conveniently be embodied in practice.

Figure 1:
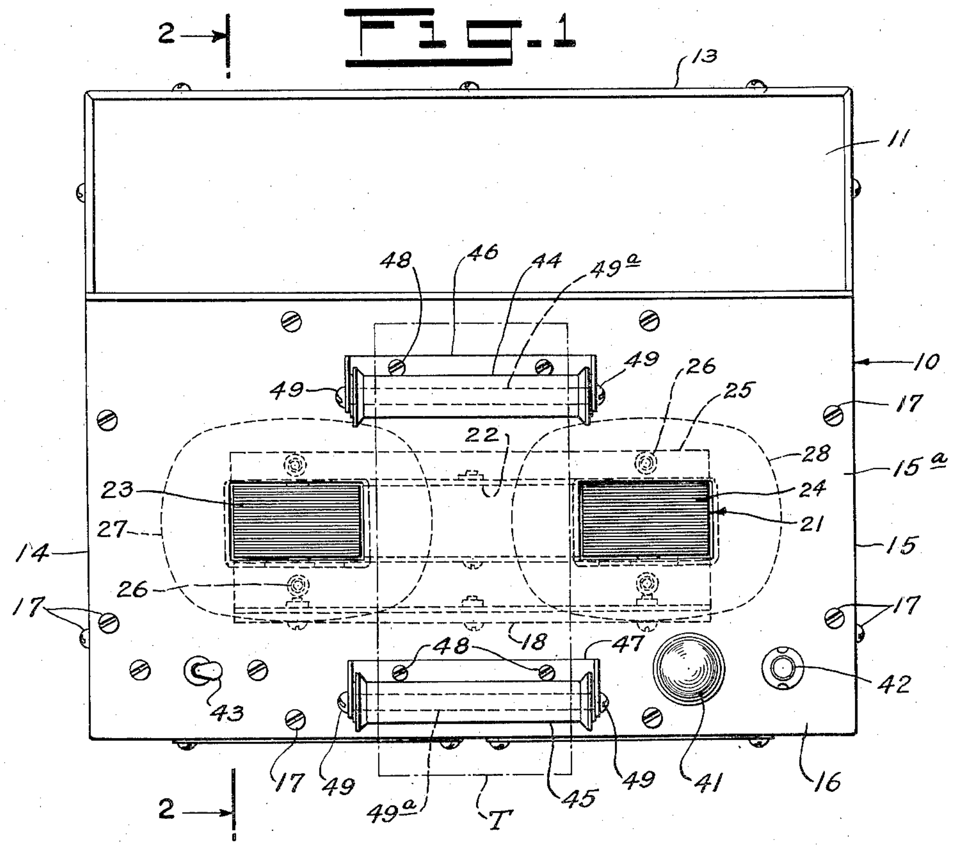
Fig. 1 represents a top plan view of a magnetic erasing apparatus embodying the invention.

In magnetic tape recording it has been customary to employ a separate erasing head to erase the tape prior to its passage under the recording head. The present invention relates to a mechanism for erasing a wide magnetic tape in bulk form after it has been wound upon a cylindrical spool, and is particularly applicable to the erasure of such a roll of tape on which repeated parallel arcuate tracks have been recorded, such as was disclosed in a copending application S. N. 255,184, filed November 7, 1951, by Lyon, Runge and Thompson, entitled "Long Playing Magnetic Tape Recorder."

In the demagnetization of a large spool of wide magnetic tape, such as a spool 7 inches in diameter and 3 inches wide, it was found that far greater difficulty was encountered than when erasing a narrow tape of the customary width of about ¼".

Thus, in order to develop a demagnetizing field over the entire area of the 7 inch spool, an apparatus of extreme complexity would be required, which has been avoided by the present invention where the spool is manually rotated slowly through the field produced by a pair of electromagnetic coils, making it possible to utilize the concentrated field along a radius of the spool.

2

Even with this expedient, the necessary wide gap of 3 inches between the pole pieces presented unusual problems. If the amount of wattage input to the demagnetizing coils were unlimited, the problem of course would become a matter of merely providing enough ampere turns on the magnetic structure to develop the necessary magnetic field across the gap, required for demagnetization. In such a case, an ordinary 60 cycle line voltage would have been suitable.

It was found, however, that the high currents necessitated, because the coil inductance had to be kept low for the required number of ampere turns, caused excessive heating of said coils, also the necessity of specially-fused power lines is a real obstacle to the use of such an apparatus.

In the development of the present invention, the first expedient to overcome this difficulty was the introduction in series with the electromagnetic coils of a condenser, the capacity of which introduced a reactance in opposing phase relationship to the inductance of the coils, and permitted the use of a larger number of turns on the magnetizing coils to obtain the required ampere turns at a given voltage.

When further experiments were made, varying the size of the capacitor in comparison with the number of turns of wire on the coil and the voltage used, an interesting phenomenon took place. It was observed, with a given number of turns in the coils (and therefore a given amount of inductance) together with a critical value of capacity, that when the voltage was gradually increased, the current would suddenly increase by a considerable amount, and simultaneously the wave form across the coils often became very peaked. This sudden discontinuity and change from the sinusoidal form of wave was probably due to the occurrence of the following cycles of events: Since the capacity was insufficiently great to produce resonance with the inductance of the coil at low currents, the circuit was not close to resonance for such low currents.

However, as the voltage increased, the current in the coils also increased. With a fixed number of turns on the coils, and a fixed cross-section of the iron core pole, a condition was soon reached where the latter started to become saturated on the peaks of the current, thus decreasing the effective inductance and bringing the circuit closer to resonance. As the circuit came still closer to resonance, the current further increased, again decreasing the inductance. When the iron cores became totally saturated, the circuit acted as though there was no iron there at all, and the inductance tended to become that of an air core device.

Thus, once a critical voltage from the power source was reached, a cycle was started and almost instantly the current built up to a maximum. In other words, an equilibrium condition established itself where the effective inductance and the capacitor values were exactly tuned to resonance at 60 cycles for a given current flow. This became a stable condition, but frequently there was so much saturation at this point that the wave form became decidedly peaked and rich in harmonics.

When actually testing a roll of wide magnetic tape with this device, employing a current of peaked wave form, rich in harmonics, an unusually excellent degree of magnetic erasure was obtained, because the field from the higher frequencies served as a better erasing means than a lower 60-cycle frequency field. It was also discovered that by reducing the amount of iron in the structure to a minimum the peaked wave form could be exaggerated.

When this phenomenon was made use of, it was possible to obtain an eraser of reasonable size operating on a 100-volt 60 cycle power line employing a reasonable current of the order of only 3 amperes, which was equivalent in result to a coil using as much as 30 amperes.

Referring now to the drawings in which like reference numerals denote corresponding parts throughout the several views, the numeral 10 indicates a cabinet in which the magnetic eraser apparatus is housed, said cabinet having a storage compartment 11 for receiving the power cord when the eraser is out of use. The cabinet 10 is provided with a bottom 12, a rear wall 13, side walls 14, 15, and a non-magnetic cover plate **15*a***.

The cabinet 10 is also provided with a front panel wall 16 for receiving the electrical control instruments. The bottom 12 and the walls 13, 14, 15, 16 are secured to the cabinet 10 by means of screws 17. Provision is also made of a terminal strip 18 upstanding from the bottom 12, said strip carrying two pairs of horizontal binding posts 19, 20.

In order to produce the demagnetizing alternating flux (or erasing field) provision is made of a vertically mounted U-shaped laminated soft iron core 21, having a horizontal base 22. The core 21 is constructed of a pair of vertical side pole pieces 23, 24, the laminations of said core being secured together by rivets **24*a* a tape 24*b*, and a screw bolt 24*c*. The core is preferably mounted upon a rigid channel-shaped bracket 25 having attaching screws 26 passing through the bottom 12 of the cabinet 10**.

A pair of cylindrical highly inductive horizontal electromagnetic coils 27, 28 surround the poles 23, 24 of the core 21, each of said coils having a large number of turns, and having taps 29, 30, which are connected by leads 31, 32 to the binding posts 19, 20 on the terminal strip 18.

Figure 2:
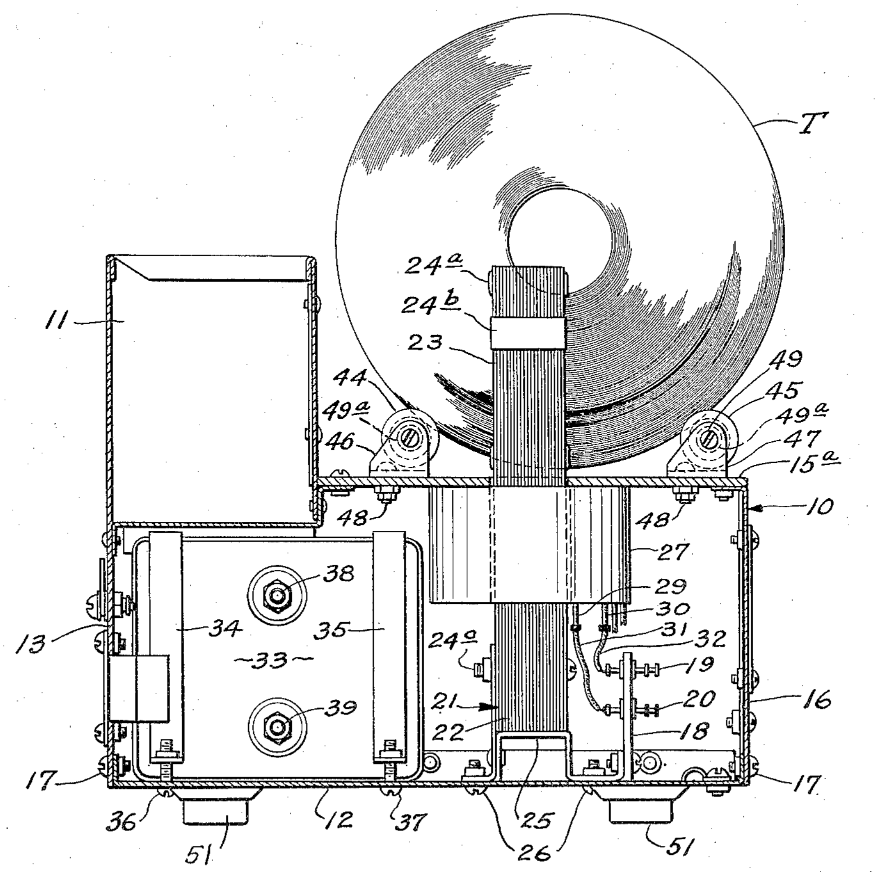
Fig. 2 is a side view of the same in elevation.

The circuit in which the coils 27, 28 are included, will be tuned by a capacitor 33 of rectangular shape, and provided with a pair of U-shaped holding straps 34, 35 secured to the bottom of the cabinet by means of screws 36, 37. The capacitor 33 is also provided with a pair of horizontal binding posts 38, 39, as clearly shown in Figs. 2 and 4 of the drawing.

Figure 4:
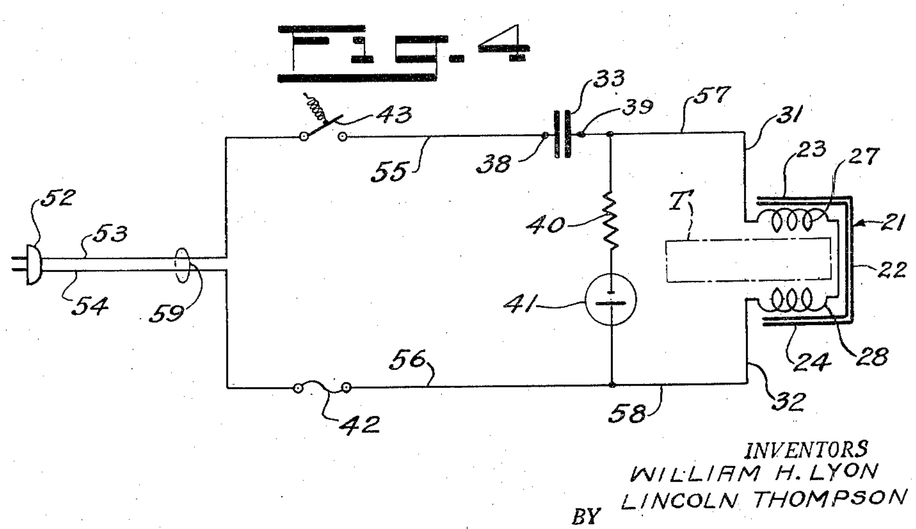
Fig. 4 is a schematic diagram of the electrical circuits of the apparatus.

In order to indicate when sufficient current is being passed through the demagnetizing apparatus to erase the impressions recorded upon the roll of magnetic tape T, provision is made of a resistor 40 in series with a neon lamp 41, and connected in shunt across the coils 27 and 28 (Fig. 4).

In order to prevent injury to the apparatus by overloading, provision is made of a fuse 42 located in the main electrical circuit, as shown.

The magnetic eraser may readily be turned on and off by a switch button 43 located on the front panel 16 of the cabinet. The switch button 43 is preferably provided with a tension spring for normally urging it to open position.

The roll T of recorded wide magnetic tape to be erased is adapted to be supported by a pair of elongated nonmetallic rollers 44, 45 which are mounted horizontally with their ends seated in a pair of U-shaped brackets 46, 47 and which are secured at their bases to the cover **15*a* of the cabinet by screws 48, 49. The brackets 46, 47 serve to hold a pair of horizontal parallel pins 49*a* within the rollers 44, 45** to permit said rollers to rotate freely when the roll of tape resting thereon is twisted manually about its horizontal axis.

Provision is also made of a plurality of rubber feet 50, 51 (four in this instance), located on the bottom 12 of the cabinet, to prevent scratching of the table upon which the magnetic erasing apparatus is mounted.

In order to energize the magnetic eraser, provision is made of a 2-prong plug 52 which is adapted to be inserted into any convenient source of electric current (preferably 110 volts, 60 cycles). The plug 52 is connected by a power cord comprising wires 53, 54 to the tuned electrical circuit previously described. The numerals 55, 56, 57, 58 indicate hook-up wires clearly shown in Fig. 4, and the numeral 59 indicates a power cord jack socket (Fig. 4) for permitting the power cord to be removed and stored in the compartment 11 when not in use.

Figure 5:
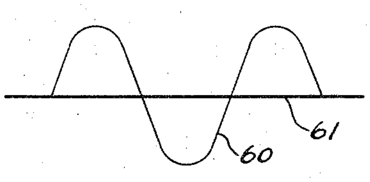

In Fig. 5, the numeral 60 indicates the shape of a standard sinusoidal wave normally supplied by a power line with a 60 cycles alternating current, with reference to a horizontal axis 61.

Figure 6:
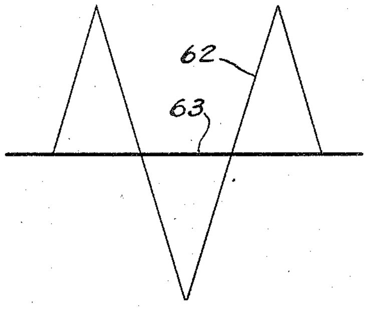
Figure 3:
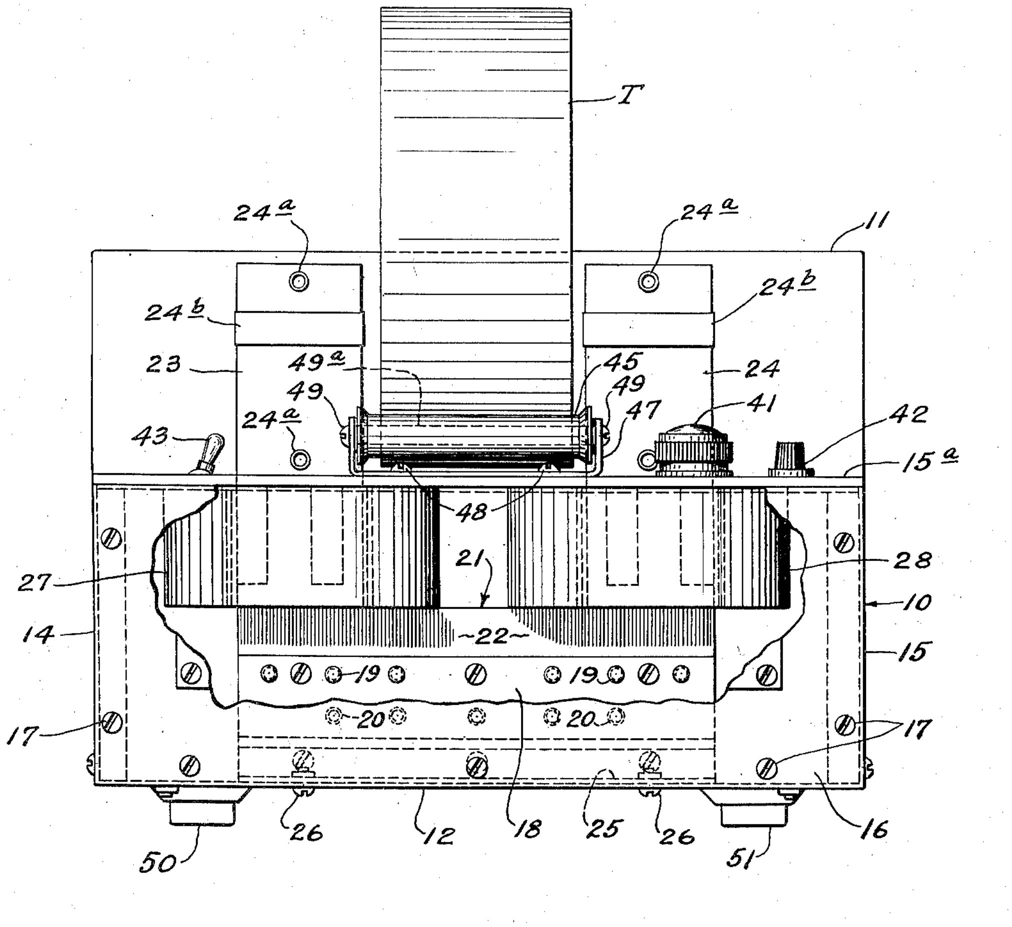
Fig. 3 is a rear elevational view of the same.

Fig. 6 indicates the peaked form of the wave 62 with reference to a horizontal axis 63, which often occurs with carefully minimized iron in the core, when the coils of the tuned circuit have been energized in the manner disclosed above for producing the erasure of the magnetically recorded material from a roll of tape T.

*Operation*

In operation, the cylindrical roll T of wide magnetic tape to be demagnetized will be placed upon the horizontal rollers 44, 45 mounted on the cover **15*a* of the cabinet 10. The switch button 43 will then be swung to connect the power of the supply plug 52 to the wires 53, 54 for energizing the circuit including the capacitor 33 and the inductance coils 27, 28 which are in series with each other, and causing the neon lamp 41** to light up when sufficient voltage is present to cause the complete erasure of the tape T.

The roll T will then be slowly rotated manually to cause the entire circumference thereof to pass through the demagnetizing field of the coils 23, 25. Preferably the rotation will be continued at least three times in order to insure the complete eradication of the recorded magnetic impressions on the roll of tape T.

The roll T will then be slowly removed from the field of the coils to insure that no residual impressions will be left on the tape. The entire manipulation of the roll T into and out of the erasing field of the core and coils will not usually require over 10 seconds.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a demagnetizing apparatus for a roll of paramagnetic tape which has been magnetically recorded, a pair of highly inductive electromagnetic coils, a U-shaped core of laminated iron having pole pieces projecting through said coils, a tuned circuit including said coils for connection with a source of alternating current means to support said roll of tape between said pole pieces with the plane of said roll normal to the lines of force between said pole pieces for rotation of said roll of tape about its central axis to bring all portions of the roll through the erasing field between said pole pieces.

2. The invention as defined in claim 1, in which said support means comprises a pair of horizontally mounted parallel spaced rollers.

3. The invention as defined in claim 1, in which the electromagnetic coils are connected in series in a tuned circuit with a capacitor in such a manner as to permit the operation of the erasing apparatus from an ordinary voltage supply and with low current, said tuned circuit being resonant at the power frequency.

4. The invention as defined in claim 1, in which said coils are in series with a tuned 60 cycle circuit, and in which the iron of said core is minimized so that the current passing through said circuit will have a peaked wave form rich in harmonics and producing a high demagnetizing effect in comparison with the energy of input.

5. The invention as defined in claim 1, in which a power supply of ordinary voltage is employed, and in which the electromagnetic coils have a large number of turns so that when the circuit is tuned with a normal-sized capacitor, a low amperage current may be employed.

6. The invention as defined in claim 1, in which said capacitor is of retangular shape and is secured to the base of the cabinet by a plurality of looped straps.

7. The invention as defined in claim 2, in which said roller bearing pins are supported at their ends by U-shaped brackets attached to the cover of the cabinet.

8. The invention as defined in claim 3, in which a neon lamp and a control resistor are employed in shunt with the tuned circuit to indicate when sufficient current is being supplied for proper demagnetization of the roll of tape.

9. The invention as defined in claim 1, in which the amount of iron employed in the core is reduced to the minimum, whereby the peaked wave form of the alternating current passing through said coils will be at the maximum.

10. An apparatus for bulk demagnetizing paramagnetic material adapted to be supplied by an alternating current source having a fixed frequency and a substantially fixed voltage, a closed magnetomotive circuit including ferro-magnetic core means having an air gap, said air gap being adapted to receive said paramagnetic material to be demagnetized, and an electromotive circuit including a capacitor and a coil inductively coupled to excite said ferro-magnetic core means, said electromotive circuit being connected to said source of current to supply voltage across said coil out of phase with and substantially greater than the voltage of said source, said circuit being resonant at said fixed frequency only when said ferro-magnetic core means is substantially saturated, whereby the current supplied by said source during demagnetization will be substantially less than the current required to produce the equivalent flux density across said air gap by said ferro-magnetic core means excited by a non-resonant circuit.

11. An apparatus for demagnetizing paramagnetic material adapted to be supplied by a source of alternating current having a fixed frequency and a substantially fixed voltage, an electromagnetic circuit including a ferro-magnetic core provided with an exciting coil and having an air gap to receive material to be demagnetized, and an electric circuit including a capacitor to be connected in series with said exciting coil and said source of current to supply current to said coil out of phase with the current in said supply, the permeability and cross sectional area of said core being such as to cause it to be saturated during demagnetizing by the current supplied by said coil at said fixed frequency and substantially fixed voltage.

12. In an apparatus for bulk demagnetizing paramagnetic material adapted to be supplied by a source of current having a fixed frequency, an electromagnetic circuit including a magnetomotive circuit and an electromotive circuit, said magnetomotive circuit including ferromagnetic means to confine magnetic force in a path having high flux density, said electromotive circuit including inductance and capacitance means to introduce said para-magnetic material into said path of high flux density for demagnetizing, means to couple said electromotive circuit with said magnetomotive circuit to excite said magnetomotive circuit from said source of said fixed frequency, the respective relative values of the components of said circuits being such that said electromagnetic circuit will resonate at said fixed frequency only when said path of magnetic force confined by said ferro-magnetic means is substantially saturated.

References Cited in the file of this patent

UNITED STATES PATENTS 2,481,392 Camras ---------------- Sept. 6, 1949

FOREIGN PATENTS 233,606 Switzerland ------------ Nov. 16, 1944